United States Patent [19]

Cordova et al.

[11] Patent Number: 4,560,335

[45] Date of Patent: Dec. 24, 1985

[54] VAULT MACHINE

[76] Inventors: Elmer R. Cordova; Jeffrey D. Cordova, both of 13200 Titan Rd. S., Littleton, Colo. 80125

[21] Appl. No.: 549,673

[22] Filed: Nov. 7, 1983

[51] Int. Cl.⁴ ........................ B28B 7/16; B28B 21/80; B29C 5/03

[52] U.S. Cl. ........................................ 425/62; 249/122; 249/137; 249/141; 249/142; 249/144; 425/435

[58] Field of Search ............... 249/145, 141, 144, 122, 249/137, 142; 425/62, 435

[56] References Cited

U.S. PATENT DOCUMENTS

| | | | |
|---|---|---|---|
| 1,123,586 | 1/1915 | Pfiffner | 249/137 |
| 1,151,309 | 8/1915 | Urban | 249/137 |
| 1,181,032 | 4/1916 | Peckham | 249/137 |
| 1,182,944 | 5/1916 | Urban | 249/144 |
| 2,228,123 | 1/1941 | McMurray | 249/144 |
| 2,397,223 | 3/1946 | Valdastri | 249/141 |
| 3,259,679 | 7/1966 | Nielsen | 249/137 |
| 3,281,110 | 10/1966 | Lister | 249/137 |
| 3,542,914 | 11/1970 | La Vergne | 249/137 |
| 4,080,129 | 3/1978 | Little | 249/137 |
| 4,431,397 | 2/1984 | Fried et al. | 249/137 |

*Primary Examiner*—Willard E. Hoag

*Attorney, Agent, or Firm*—Klaas & Law

[57] ABSTRACT

An apparatus for forming concrete burial vaults and the like. The apparatus comprises a plurality of forms which are movable independently and as a unit in a series of operating steps to form a completed vault. Drop-in apparatus for forming a compound vault is also described.

40 Claims, 25 Drawing Figures

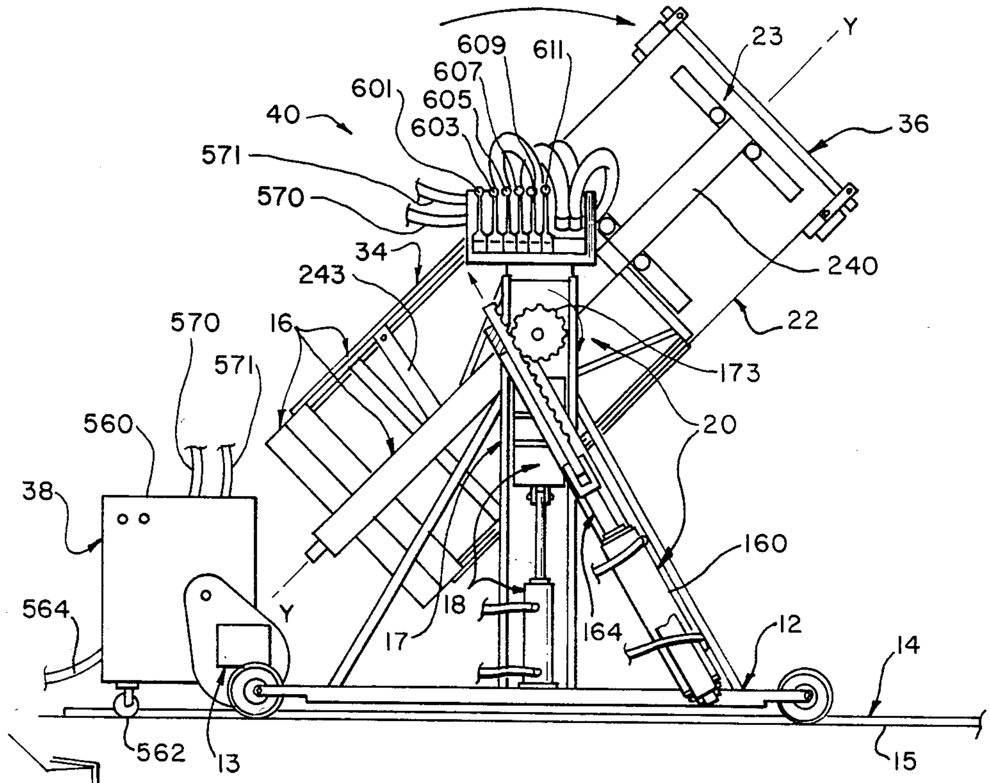
FIG. 2
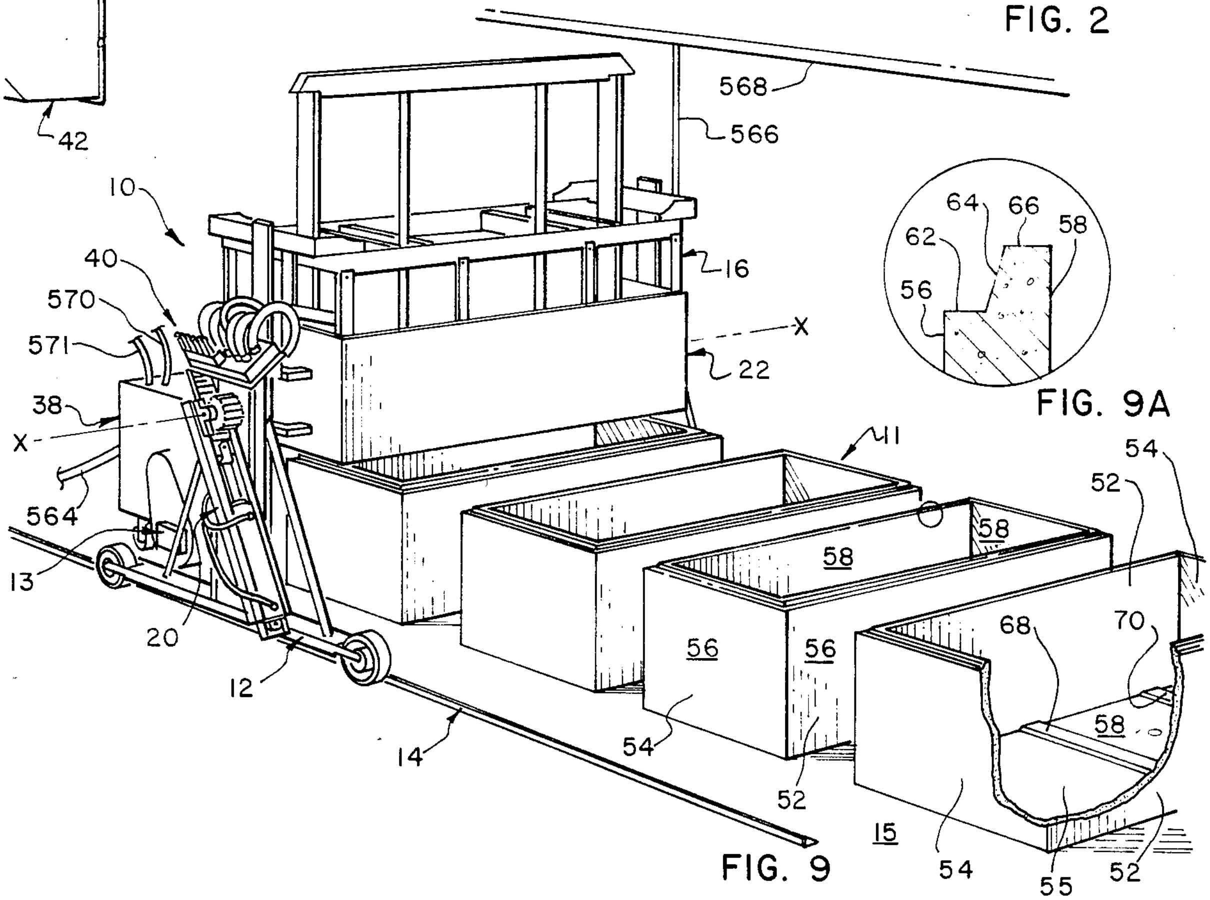
FIG. 9
FIG. 9A

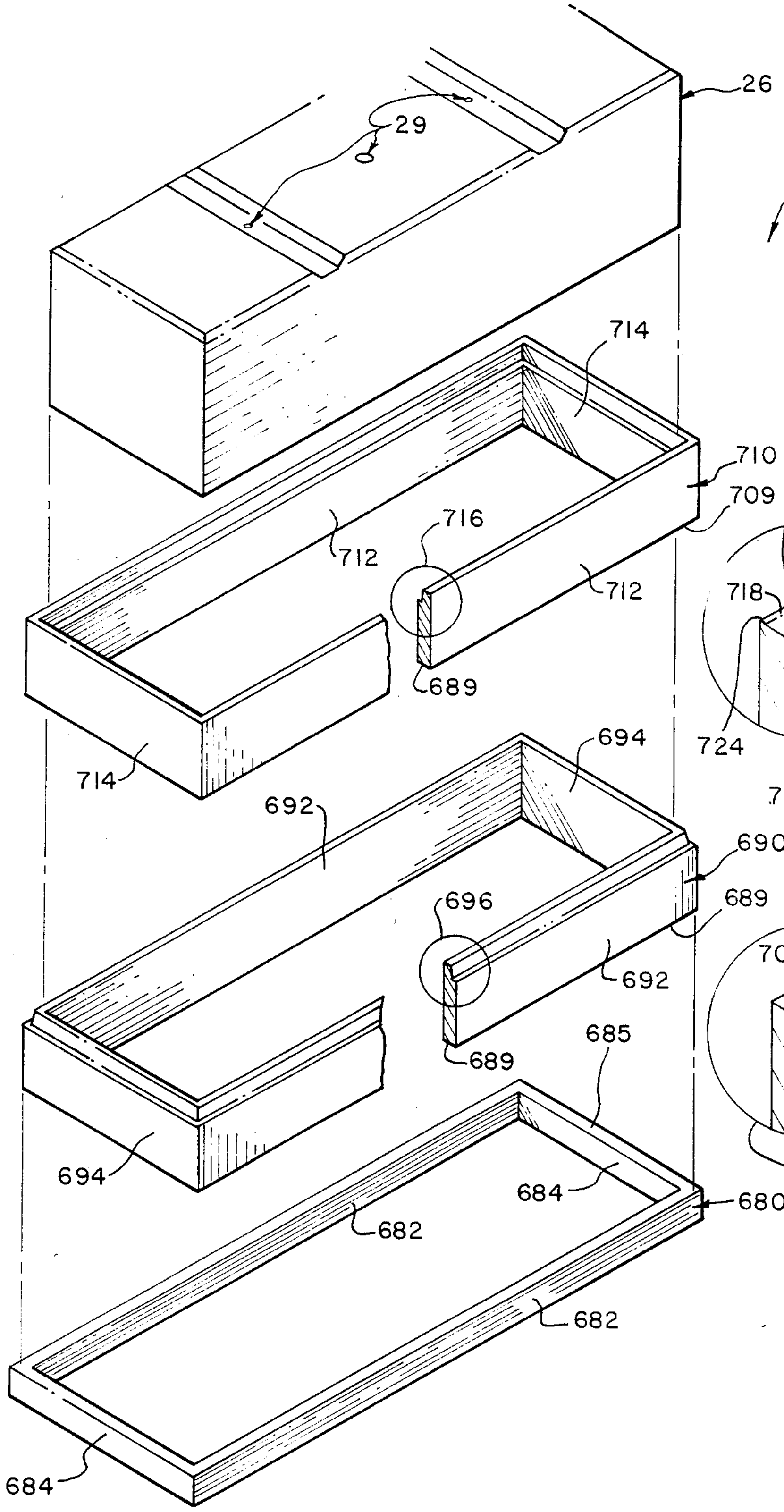
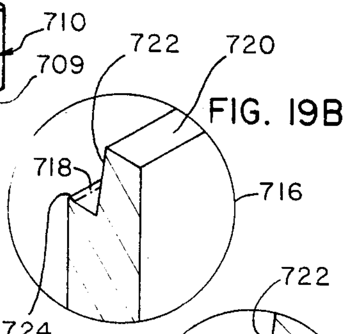
FIG. 19B
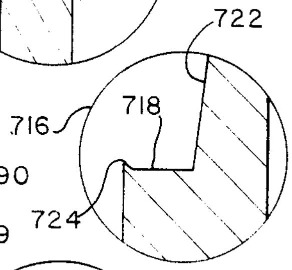
FIG. 19C
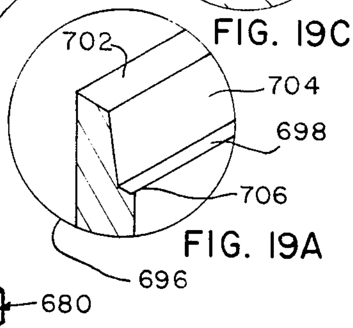
FIG. 19A
FIG. 19

VAULT MACHINE

BACKGROUND OF THE INVENTION

The present invention relates generally to method and apparatus for making vaults from a material such as concrete, or the like, and more specifically to method and apparatus for making concrete burial vaults having a horizontal bottomwall and substantially vertical sidewall integrally formed with the bottomwall and extending around the periphery thereof.

Burial vaults are used to shield a casket received therein from direct contact with the surrounding earth or atmosphere and thus tend to preserve the coffin and its contents and also to prevent setting of ground at a grave site. Burial vaults have long been in use in the United States, both in connection with cemetery burial plots and also in connection with mausoleums or the like, wherein caskets are entombed above ground.

Such burial vaults are generally constructed from concrete and have a regular parallelepiped shape, i.e. a rectangular box-like configuration, including a horizontal bottomwall having a rectangular configuration and a vertical sidewall including two longitudinal sidewall portions and two transverse sidewall portions integrally formed with the bottomwall. The sidewall and bottomwall are generally on the order of two inches thick. A vault cover which generally comprises a concrete slab of approximately the same size and shape as the upper peripheral edge surface formed by the sidewall portions is mounted on top of the vault to form a completed vault assembly. The upper peripheral edge of the vault and the vault cover may contain mating surfaces which act to seal the vault and prevent dislodging of the cover.

Until the present invention, the construction of concrete burial vaults was a very time consuming and labor intensive operation. The operation generally consisted of first constructing an inner form having a sidewall and bottomwall configuration identical to the interior surfaces of the sidewall and bottomwall of the vault-to-be-formed. The inner form was then mounted on a pallet or other flat based surface with the bottomwall of the inner form positioned upwardly. An outer form consisting of four sidewalls having a configuration identical to the outer sidewall configuration of a vault-to-be-formed was next assembled around the inner form. It was next necessary to accurately place the outer form with respect to the inner form to ensure that a vault having equal wall thickness on all sides would be provided. The forms are next oiled. It was next conventional to suspend wire mesh or the like into the cavity formed by the inner form and the outer form to provide additional strength to concrete poured into the cavity. The form cavity was next filled with concrete and vibrated to provide proper material distribution throughout the form cavity. The form cavity was filled to a level approximately even with the upper peripheral edge of the outer form and was thereafter screeded or "struck off" to form a relatively smooth surface, even with the top of the outer form. The concrete was thereafter allowed to dry until the concrete was sufficiently strong to allow removal of the forms. First the outer form was stripped off. Next the vault was rotated 180° onto its bottom surface and the inner form was removed. Such an operation generally required the services of 2 laborers. Due to the curing time, etc., for vault formation, it generally took on the order of at least 8 hours from the time form erection began until the time that a vault was completed. Such operations are still standard in the industry today.

It would be generally desirable to provide a machine capable of forming a concrete vault which eliminates many of the labor intensive activities presently used in vault making. It would also be desirable to provide a vault making machine capable of making a concrete vault in substantially less time than presently required by manual techniques. It would further be desirable to provide a vault machine capable of forming a vault of a standard configuration by a process which substantially reduces the costs of manufacture of such vaults. It would further be desirable to provide a vault making machine capable of replacing numerous sets of standard forms.

SUMMARY OF THE INVENTION

The present invention comprises a vault machine for automatically making concrete burial vaults of the type having a horizontal bottomwall and a substantially vertical sidewall positioned about the periphery of the bottomwall and integrally formed therewith. The vault machine comprises a series of forms which may be moved independently of one another and also as a unit to provide the various functions associated with vault formation in a mechanized assembly. In addition to the standard vault forming procedures, an additional procedure which causes compression of the concrete material within the vault formed cavity is provided. This compression procedure adds initial strength to the concrete, and thus allows the various forms to be removed more quickly than in conventional procedures to substantially shorten vault production time. In a preferred embodiment, the various automatically movable forms are provided on a carriage device which allows a vault to be positioned at a selected point removed from the position where the forms are loaded with concrete, thus facilitating storage and subsequent transportation of the vaults.

In the preferred embodiment of the invention, the vault machine comprises an outer form means including four sidewalls integrally connected in a rectangular configuration and open at the end faces associated with the top and bottom of a vault; an inner form means including four integrally connected sidewalls and a bottomwall positioned substantially perpendicular to the inner form sidewalls and integrally connected therewith. Venting means are preferably provided in the bottomwall of the inner form means and may comprise a plurality of holes having removable plugs therein. Additionally, the inner form bottomwall may be provided with a configuration having recessed portions therein to form transverse raised portions in the bottomwall of a vault-to-be-formed which accept a casket thereon in raised relationship throughout with the remainder of the vault floor. A bottom form means is provided which may be a pallet which is removably attachable about the peripheral edge surface at one end of the outer form to form the bottomwall exterior surface of a vault. The vault sidewall upper peripheral edge surface is formed by a peripheral edge form means having a width substantially equal to the dimension between the inner form and outer form in the vault wall forming region. In the preferred embodiment, this peripheral edge form means is a compression ring which may be moved from an initial position which it occupies during pouring of concrete into the form cavity to a compression position located a few inches inwardly toward the bottom form means. The compression ring preferably comprises a lip configuration which produces a vault upper peripheral edge which mates with a complementary surface of a vault cover. In one of the embodiments of the invention, the compression ring comprises a fixed portion and a removable portion. The removable portion being dropped into the formed cavity prior to pouring of concrete therein. The drop-in portion is retained on top of the vault for a short period of time after removal of the other forms to help strengthen the concrete during its initial setting state. Complementary drop-in forms having mating vault peripheral edge forming configurations may be used to form half vaults having a depth substantially smaller than conventional vaults. The half vaults may be mounted with edge portions thereof in mating relationship to provide a compound vault of a conventional dimension.

The various form means of the vault machine may be mounted on a mainframe means which allows the forms to be rotated as a unit and to be moved linearly as a unit to enable various forming operations. Each of the form means is also independently, linearly displaceable with respect to the mainframe means to allow independent movement thereof with respect to the mainframe for providing other vault forming functions.

Various displacement means may be used for performing the various movements of the mainframe and form members, for example, conventional hydraulic or pneumatic cylinders provided with a conventional power supply and operated by conventional control valves may be used.

A method of forming a vault using the apparatus of the present invention may include: positioning the inner form and outer form and wall edge form in relative position with respect to one another to form a form cavity having the general shape of a concrete vault to be formed and having a cavity opening defined by the bottom peripheral edge of the outer form; positioning the forms in an orientation with respect to the earth such that the cavity opening is uppermost; uniformly filling the form cavity with concrete to a level even with the bottom peripheral edge of the outer form; covering the cavity opening by fixedly attaching the bottom cover form to the outer form at its lower peripheral edge; rotating the forms as a unit without relative movement therebetween to a position such that the bottom cover form is lowermost; lowering the forms as a unit such that the bottom cover rests on a base surface; lowering the wall edge form with respect to the other forms to compress the concrete within the form cavity; venting the inner form at a wall portion thereof which is in contact with a bottom wall portion of the vault so as to prevent vacuum formation when the inner form is withdrawn; detaching the bottom form from the outer form; moving the inner form upwardly relative the other forms to a position above the lowermost portion of wall edge form; moving the outer form upwardly with respect to the other forms to a position above the lowermost portion of the wall edge form; moving the wall edge form upwardly such that it is disengaged from the concrete.

BRIEF DESCRIPTION OF THE DRAWINGS

An illustrative and presently preferred embodiment of the invention is shown in the accompanying drawing in which:

FIG. 2 is a side elevation view of a vault machine with forms in a partially rotated position;

FIG. 9 is a perspective view illustrating the operation of a vault machine and vault construction;

FIG. 9A is a detail cross-sectional view of a vault sidewall upper peripheral edge;

FIG. 19 is an exploded partially cut-away view illustrating the relationship of edge form drop-in portions with respect to an inner form and an edge form affixed portion;

FIG. 19A is a detail perspective view illustrating the edge forming surface of a first drop-in portion;

FIG. 19B is a detail perspective view illustrating an edge forming portion of a second drop-in portion;

FIG. 19C is a detail side elevation view of the edge forming surface illustrated in FIG. 19B;

DETAILED DESCRIPTION OF THE DRAWINGS

As best illustrated by FIG. 9, the vault machine 10 of the present invention is used for constructing structures such as concrete burial vaults 11 having a generally rectangular box-like configuration.

Figure 1:
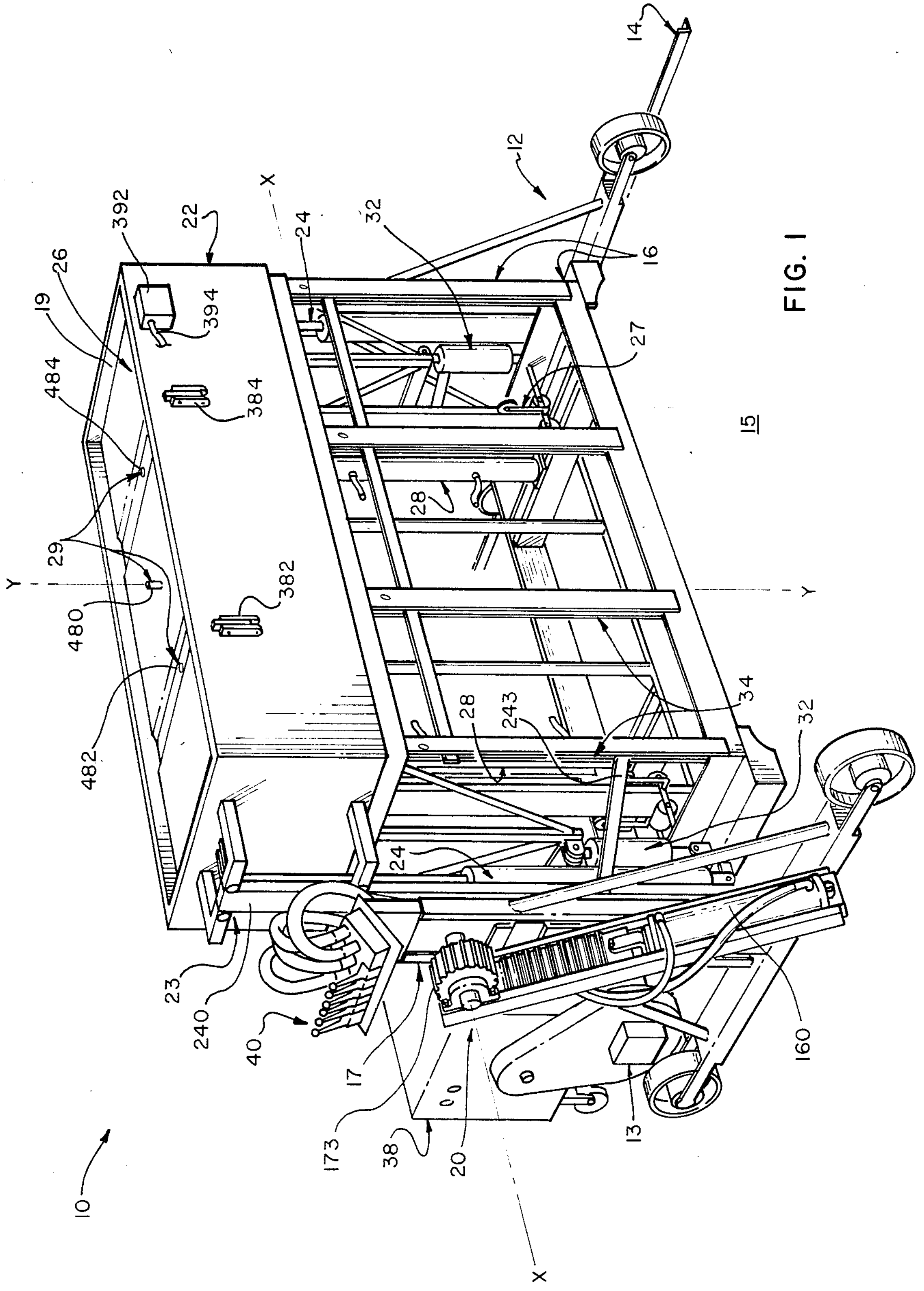
FIG. 1 is a perspective view of a vault machine with forms in a position associated with filling of the form cavity.
Figure 3:
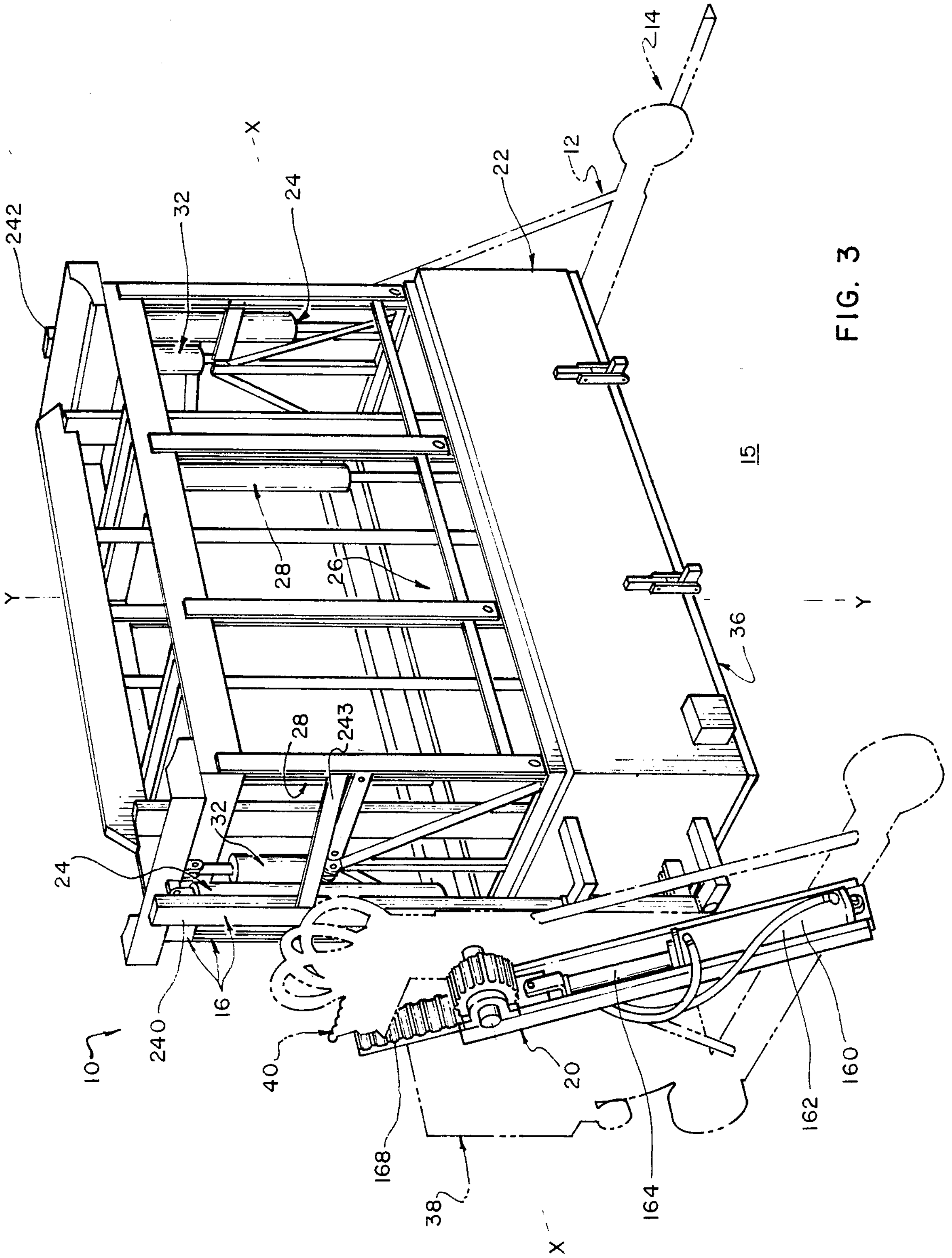
FIG. 3 is a perspective view of the vault machine with certain portions thereof in phantom, with forms in a position inverted from the position of FIG. 1.

As best shown by FIGS. 1, 2, and 3, various components of the vault machine 10 are supported by a carriage means 12. In the preferred embodiment, the carriage means is wheel-mounted and may be moved over a generally horizontal base surface such as a shop floor 15. Driving force for moving the carriage may be provided by a carriage movement means 13 such as a hydraulic motor. A track means 14 may be provided to co-act with portions of the carriage means to guide its movement along a predetermined horizontal path.

Figure 4:
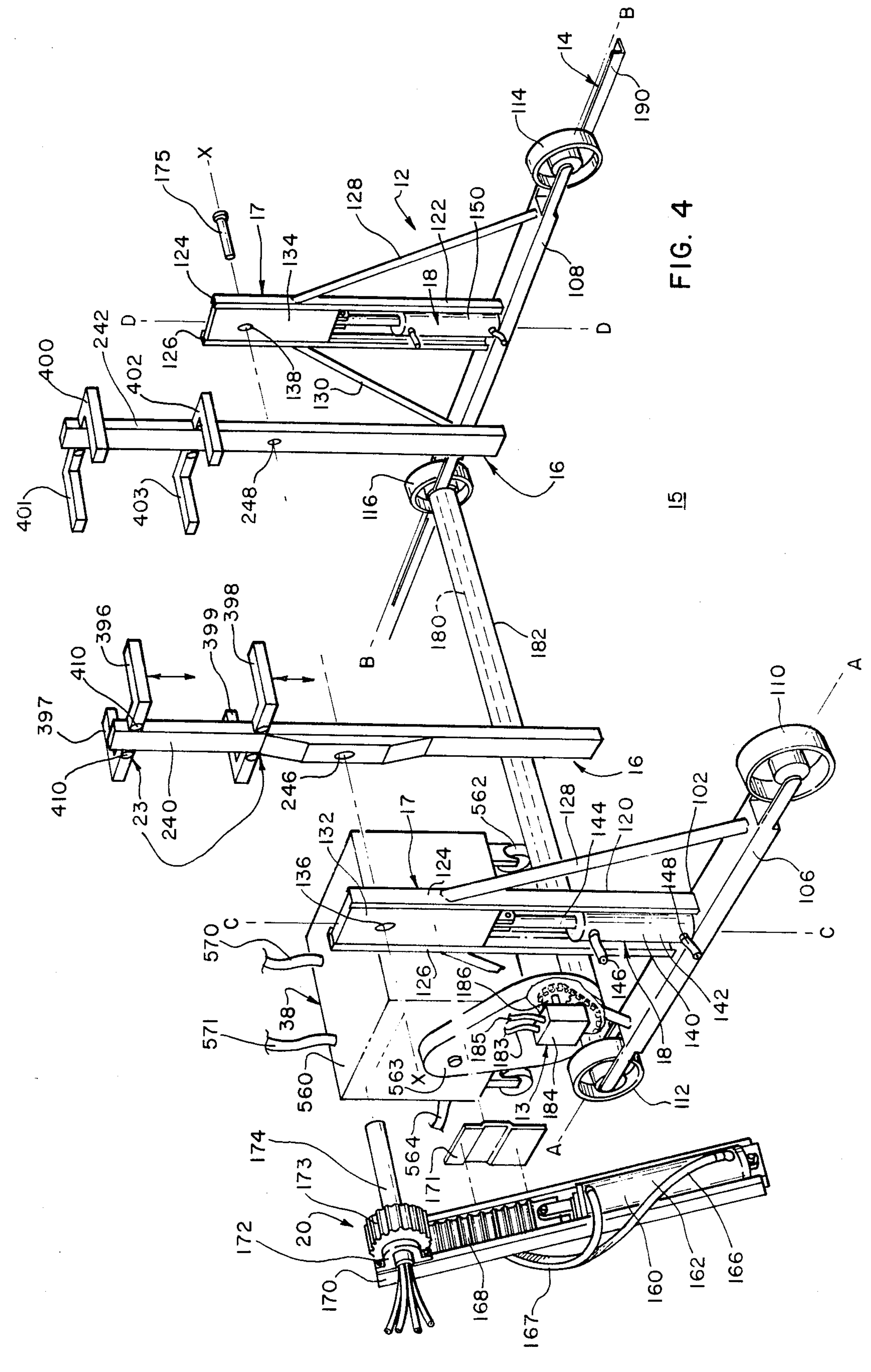
FIG. 4 is an exploded view of certain carriage and mainframe portions of a vault machine and associated linear and rotational displacement apparatus and power supply of the vault machine.

A mainframe means 16 consisting of a plurality of rigidly connected structural members is operably mounted between opposite portions of the carriage means 12. The mainframe means 16 is mounted on the carriage means in a manner such that it may be rotated about a machine central longitudinal axis XX which is substantially horizontal (i.e. parallel to base surface 15) and, in the preferred embodiment, perpendicular to the direction of travel of the carriage means 12. The mainframe is also linearly displaceable in a vertical direction with respect to the carriage means 12 and is guided along a linear displacement path relative the carriage means by a mainframe guide means 17 mounted on the carriage means. The paths of vertical travel of opposite ends of the mainframe means 16 at the points of connection thereof to the carriage means 12 are indicated in FIG. 4 as vertical axes CC and DD. The mainframe means may be displaced linearly by linear displacement means 18 such as hydraulic cylinders. The mainframe means may be displaced angularly about axis XX by a mainframe angular displacement means 20 such as a pinion gear, rack and cylinder assembly. Outer form means 22 are provided for forming the exterior sidewall surfaces of the vault 11. The outer form means is mounted on the mainframe means 16 by mounting means 23 which provide a guide means for guiding the outer form means 22 along a linear path of travel with respect to the mainframe means 20 which is parallel axes CC and DD. Linear movement of the outer form means 22 with respect to the mainframe means 16 may be produced by an outer form linear displacement means 24 such as hydraulic cylinders. As illustrated in detail in FIG. 7 and 8, an inner form means 26 for forming the interior surfaces of the vertical sidewall of a vault and the interior surface of the vault horizontal bottomwall is also displaceably mounted on the mainframe means 16. An inner form mounting means 27 may comprise inner form guide means for guiding the inner form means along a predetermined path of travel with respect to the mainframe means 16 which is also parallel to axes CC and DD. The inner form means 26 may be moved into the enclosure formed by the outer form means 22 to define therewith a portion of a form cavity 19. Inner form linear displacement means 28, such as hydraulic cylinders, are provided for displacing the inner form means with respect to the mainframe means. Inner form vent means 29 are provided to allow equalization of air pressure in the area between a vault being formed and the inner form means 26 as the inner form means is removed from the vault at the end of the forming process. A sidewall upper peripheral edge form means 30, which in the preferred embodiment also comprises a forming material compression means, is displaceably mounted with respect to the mainframe means as illustrated in detail in FIG. 5. The edge form means 30 may be disposed between the outer form means 22 and inner form means 26 to define a portion of the form cavity 19 associated with the sidewall upper peripheral edge surface of a vault-to-be-formed. The edge form means 30 in the preferred embodiment may be moved inwardly to compress the concrete in the form cavity 19. Displacement of the edge form means 30 with respect to the mainframe means may be provided by edge form linear displacement means 32 such as hydraulic cylinders. The path of travel of the edge form means 30 with respect to the main frame means 16 may be guided as by edge form guide means 34 which may form a portion of the mainframe means 16. A bottom form means 36, which in a preferred embodiment may also serve as a bottom pallet for the completed vault 11, may be clampingly attached to the outer form means 22, as illustrated in detail in FIG. 8 to completely enclose form cavity 19. Power supply means 38, such as a conventional electric motor hydraulic pump and reservoir assembly, may be provided in an enclosed unit which may be wheel mounted and pulled behind the vault machine carriage means 12 as it moves from one position to another in the vault forming process. Control means 40, such as conventional hydraulic control valves may be provided for controlling the various displacement functions of the vault machine 10.

In general, the vault forming operation may begin with actuating the various vault machine displacement means to place the vault machine in an orientation wherein the inner form means is disposed within the outer form means and the edge form means is disposed between the inner form means and outer form means to define a form cavity 19 of the same general configuration as a vault 11 to be formed. The vault machine mainframe means 16 is oriented in a position such that an open portion of the form cavity 19 associated with the bottomwall of the vault is positioned uppermost and the portions of the formed cavity associated with the vault wall upper peripheral edge is positioned lowermost. Concrete or other material pourable in a first state and setting in a hard solid second state, is conveyed into the formed cavity 19 by a forming material conveying means 42 such as a concrete chute. The concrete may be vibrated as it is poured into the form cavity. After the cavity is filled to the top and screeded, the bottom form means 36 is clamped to the outer form means to cover the open portion of the form cavity 19. Thereafter, the mainframe means is inverted to position the bottom form means 36 in a lowermost position. Next, the forms are lowered as a unit by moving the mainframe means downwardly until the bottom form means 36 engages base surface 15. In the preferred embodiment of the invention, the concrete within the form cavity is next compressed by downward movement of the edge form means 30 with respect to the other form means. Next, the inner form means 26 is vented by opening of vent means 29. The inner form means is then slowly lifted away from the concrete in the form cavity 19 while the other forms remain in place. Next the outer form means 22 is lifted away from the concrete to a position above the peripheral form 30. Next, the peripheral form 30 is moved away from the upper edge surface of the now free-standing vault 11. At a time prior to placement of the forms in contact with the base surface and subsequent to filling and covering the form cavity, the vault machine 10 may be moved horizontally to a removed position where after completion, a vault 11 may be conveniently stored or manipulated for other purposes. After depositing a completed vault on a base surface, the vault machine may then again be returned to the initial pouring configuration and moved to a horizontal position beneath form material conveying means 42.

Figure 20:
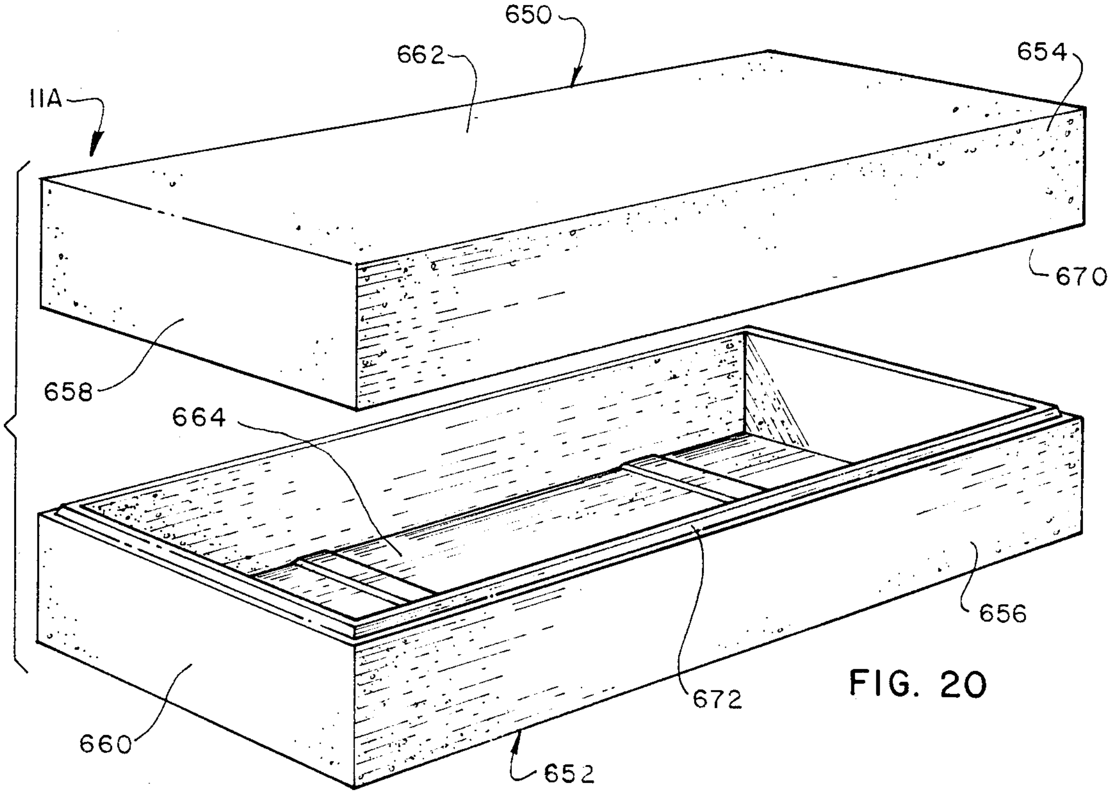
FIG. 20 is an exploded perspective view of a compound vault.

As illustrated in FIG. 9, the burial vault 11 formed by the vault machine may comprise a regular parallelepiped shape, i.e. a rectangular box. In a preferred embodiment, the burial vault comprises two longitudinal sidewalls 52 and two transverse sidewalls 54. The sidewalls are connected to one another substantially at right angles and are also integrally connected with a horizontal bottomwall 55 to form a generally rectangular enclosure. Each of the walls 52, 54, 55 has an exterior surface 56 and an interior surface 58. The sidewalls terminate in an upper peripheral edge 60. In a preferred embodiment of the invention, the peripheral edge 60 of the vault is formed to provide a mating surface with a vault (not shown) cover and thus may include a lower horizontal surface 62 integrally connected as by a diagonal surface 64 to an upper horizontal surface 66. A vault cover to be used with such a vault comprises a complementary peripheral edge surface which mates and seals with the upper edge surface configuration of the vault 11. In another embodiment of the invention, drop-in portions are provided for forming two half vaults with mating peripheral edges, FIGS. 19 and 20.

Having thus described the structure and operation of vault machine in general, the various components of the vault machine will now be described in detail.

The carriage means 12 of the present invention is used to support various components of the vault machine to allow relative displacement and rotation thereof during the vault forming process. It also allows the vault machine to deposit completed vaults at selected locations removed from the concrete pouring area. For this purpose, a wheeled carriage may be provided, however it would also be possible to provide a horizontally movable conveyor floor immediately below the form portions of the vault machine to horizontally convey vaults away from the pouring area at the completion thereof, and thus the carriage means should be understood to include such apparatus. In the preferred embodiment, the carriage means comprises a first and second carriage stand 102, 104 positioned at opposite longitudinal ends of the vault machine 10, FIG. 4. Each carriage stand may comprise a forwardly and rearwardly extending horizontal member 106, 108 having central longitudinal axes AA, BB respectively. Each horizontal member 106, 108 may be provided with a pair of wheels 110, 112, 114, 116 at either end thereof the wheels having wheel axes positioned perpendicular the member longitudinal axes AA, BB. Thus, the members 106, 108 are rollingly displaceable forwardly and rearwardly in the direction of axes AA and BB. A first carriage stand vertically extending support 120 and a second carriage stand vertically extending support 122 having vertical axes CC and DD respectively, may each comprise a pair of opposite U-shaped channel members 124, 126, fixedly attached to associated horizontal members 106, 108 as by weldement or the like. The channel members may be provided with additional support as by diagonal support members 128, 130 fixedly attached thereto. The vertically extending supports 120, 122 may provide mainframe guide means 17 for guiding the vertical displacement of the mainframe means 16. The mainframe means may be rotatably mounted in first and second carriage stand sliding plates 132, 134. The sliding plates are slidingly mounted within associated opposite pairs of U-shaped channel members 124, 126. Each plate 132, 134 may comprise a horizontally extending bore 136, 138 therein. The bores are positioned in coaxial alignment and define central longitudinal machine axis XX.

The carriage stands 102, 104 also support the mainframe linear displacement means 18 which may comprise a first hydraulic cylinder unit 140 and a second hydraulic cylinder unit 150 operably mounted thereon. The first hydraulic cylinder unit may comprise a barrel portion 142 having one end thereof operably attached to longitudinal member 106 as by pinning or other well-known attachment means. The first hydraulic cylinder unit 140 also comprises a piston portion 144 operably mounted in the barrel portion 142 and operably extendible and retractable therefrom. The free end of piston portion 144 is operably attached to plate 132 as by pinning or other conventional means. Hydraulic fluid for conventionally operating the cylinder unit may be provided to fluid ports therein as by hydraulic fluid lines 146, 148. The second hydraulic cylinder unit 150 may be of identical structure to unit 140 and may be identically mounted between horizontal member 108 and plate 134.

The mainframe angular displacement means 20 may be mounted on first carriage stand sliding plate 132 and may comprise a power cylinder means 160 having a barrel portion 162 and extendible and retractable piston portion 164 and which may be operably driven by hydraulic fluid supplied through hydraulic cylinder ports connected to hydraulic lines 166 and 167. The power cylinder means 162 may be operably attached as by pinning or the like to a rack 168 at the piston portion thereof and to a guide housing unit 170 at the barrel portion 162 thereof. The housing unit 170 at one end thereof opposite the point of attachment to the cylinder barrel portion may comprise a pinion mounting bracket 172 for rotatably receiving a pinion shaft 174 which is in turn fixedly attached to a pinion 173. The entire housing assembly 173 may be affixed to movable plate 132 as by a mounting bracket 171 and by weldement or other conventional attachment means. Relative extension and retraction of the power cylinder means piston portion 164 as illustrated in FIGS. 1, 2 and 3, causes angular displacement of mainframe means 16 as pinion 173 is engaged by tooth portions of rack 168. As also illustrated in FIG. 4, in one embodiment of the invention, the pinion shaft 174 may be a tubular shaft having a plurality of hydraulic fluid channels therein allowing connection of hydraulic fluid lines to opposite shaft ports to facilitate attachment of the hydraulic fluid lines to the various hydraulic cylinders. Shafts having fluid channels are conventional and readily available off-the-shelf items. Carriage movement means 13 may be provided as by providing wheels 112, 116 with a common axle shaft 180 which may be enclosed as by axle housing 182 and operably connected to a hydraulic motor 184 as by a drive chain and sprocket assembly 186. The hydraulic motor 184 may be conventionally reversibly driven by hydraulic fluid under pressure supplied as by hydraulic lines 183 and 185.

A track means 14 for guiding the horizontal of movement of the carriage means 12 may be provided as by an elongate linear track formed from L-shaped angle iron 190 fixedly attached to base surface 15 at a horizontal section thereof and slidingly engaging edge portions of wheels 114, 116. Many other track and roller or slide assemblies might, of course, also be used and are within the scope of the invention.

Figure 5:
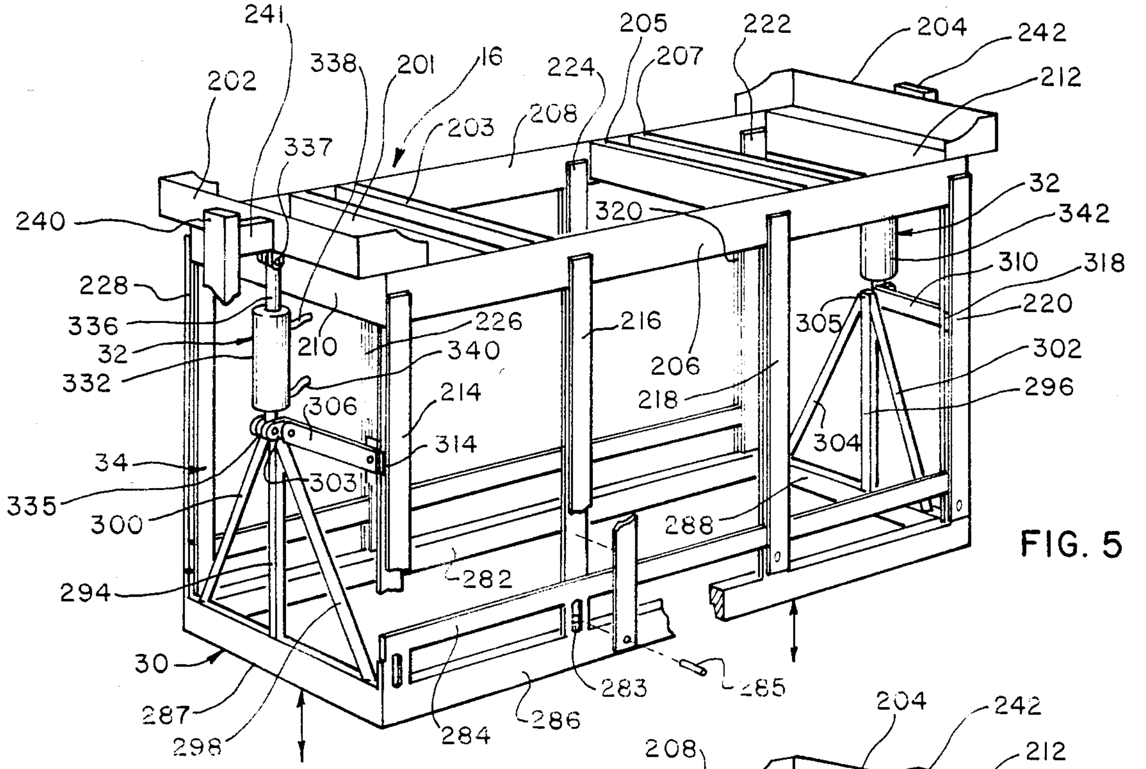
FIG. 5 is a perspective, partly cut-away, detail view of a vault machine mainframe and peripheral edge form and displacement apparatus.

The construction and arrangement of the mainframe means 16 is best illustrated by FIGS. 4 and 5: FIG. 4 illustrating a portion of the mainframe means in a position associated with concrete pouring and FIG. 5 illustrating the mainframe means in a position inverted 180° from the pouring position shown in FIG. 4. As illustrated by FIG. 5, the mainframe comprises forwardly and rearwardly extending base members 202, 204 which, in a preferred embodiment, comprise an L-shaped cross-sectional configuration conformed as from two steel plates weldingly attached at right angles. Two longitudinally extending members 206, 208 extend between the two base members and are rigidly connected thereto as by welding or other rigid attachment means. Two transversely extending members 210, 212 are rigidly attached to end portions of the longitudinally extending members 206, 208 to form a rectangular base configuration therewith. In a preferred embodiment, the longitudinally and transversely extending members comprise iron plate members or the like. Spaced apart transfer support members 201, 203, 205, 207 are fixedly attached between longitudinally extending members 206, 208 to increase the structural integrity of the mainframe means 16 and to provide attachment points for various structure as described in further detail below with reference to the inner form means 26. Pairs of vertically extending plate members 214, 216, 218, 220, 222, 224, 226, 228 are positioned about the rectangular configuration formed by member 206, 208, 210, and 212 and extend in a direction perpendicular to the mainframe central axis of rotation XX, FIG. 3. One of each pair of vertical plate members is attached to the outer peripheral surface of the rectangular base configuration and the other member is attached to the inner peripheral wall of the rectangular base configuration and define a guide slot therebetween for slidingly guiding structure associated with the edge form means 30, as discussed in further detail below. Thus, the edge form guide means 34 may comprise the vertical plate member pairs. Outer vertically extending end members 240, 242, FIGS. 4 and 5, extend perpendicular to the rectangular configuration formed by members 206, 208, 210 and 212 and are fixedly attached to the horizontal end base members 202, 204 as by longitudinally extending connector members 241 (only one shown). The outer vertically extending end members 240, 242 may be further attached to vertical pairs 214, 228 and 220, 222, respectively, as by weldingly attached diagonal connector bars 243, FIGS. 1, 2, and 3. As best shown by FIG. 4, each outer vertically extending end member 240, 242 may comprise a central bore portion 246, 248 therein which receives an end portion of an associated shaft member 174, 175 in fixed attachment therein. The shaft members 174, 175 are coaxially aligned and rotatably mounted within movable plate bores 136, 138. Thus, the vertically extending members 240, 242 and the remainder of the frame means 16, which is rigidly attached thereto, are rotatable about central machine axis XX defined by bores 136, 138. Since mainframe means 16 is rotatable, the terms "vertical" and "horizontal" as used in describing various portions thereof, are relative in some situation. However, the terms are used in this section with reference to the mainframe in the orientation shown in FIG. 5. The mainframe linear and angular displacement means 18, 20 are operated as described above and in further detail hereinafter to effect various mainframe displacements relative carriage means 12.

As best shown by FIG. 5, edge form means 30 comprises a pair of longitudinal members 280, 282 positioned parallel to the mainframe longitudinal members 206, 208. Each longitudinal member may comprise an upper guide portion 284, 286 which slides between associated mainframe vertical plate pairs 214, 216, 218, 220, 222, 224, 226, 228 and which is restricted in its path of travel as by a slot 283 and pin 285 received within slot 283 and mounted in end portions of an associated vertical plate pair. Each longitudinal member also includes a lower form portion 286 which is integrally connected to transversely extending members 287, 288 to define a rectangular configuration. As shown in detain in FIGS. 8 and 8A, the transversely extending members and lower form portion 286 of longitudinal members 280, 282 comprise an edge forming surface for forming the upper peripheral edge 60, FIG. 9A, of vault vertical walls 52, 54, FIG. 9. The edge forming surface of edge form means 30 may comprise a cross-section as shown by FIG. 8A, including a first horizontal surface 290 for forming vault peripheral edge portion 66, a second horizontal surface 292 for forming vault horizontal surface 62 and a diagonal surface 291 connecting surfaces 290, 292 for forming vault surface 64, FIGS. 9 and 9A. Each transverse member 287, 288 may be connected to an associated vertical member 294, 296 and an associated pair of diagonal members 298, 300, 302, 304, FIG. 5. Each group of associated vertical and diagonal members 294, 298, 300 and 296, 302, 304, may be rigidly connected at upper end portions thereof at 303 and 305 respectively, in a triangular strut arrangement which provides substantially uniform pressure distribution across each transverse member with respect to a load applied at the points of connection 303, 305. Horizontal members 306, 310 may be pinned to each connection point 303, 305 and at a point 314, 318 on an associated adjacent pair of mainframe vertically extending plate pairs 214, 220, to provide further structural support to resist transverse movement when an associated cylinder means is operated.

An edge form means linear displacement means 32 may be provided as by a pair of cylinder means 332, 342 operably mounted between a fixed point on the mainframe 16 and a fixed point on the edge form means 30. In a preferred embodiment, cylinder means 332 comprises a hydraulic cylinder means including a barrel portion 334 pinned as by a clevis assembly 335 to edge form connection point 303 and a piston portion 336 attached as by a clevis assembly 337 to mainframe base member 202 and conventionally operated by hydraulic fluid under pressure supplied to fluid ports therein as by hydraulic lines 338, 340. Cylinder means 342 may be identical to hydraulic cylinder means 332 and similarly attached to base member 204 and connection point 305.

Figure 6:
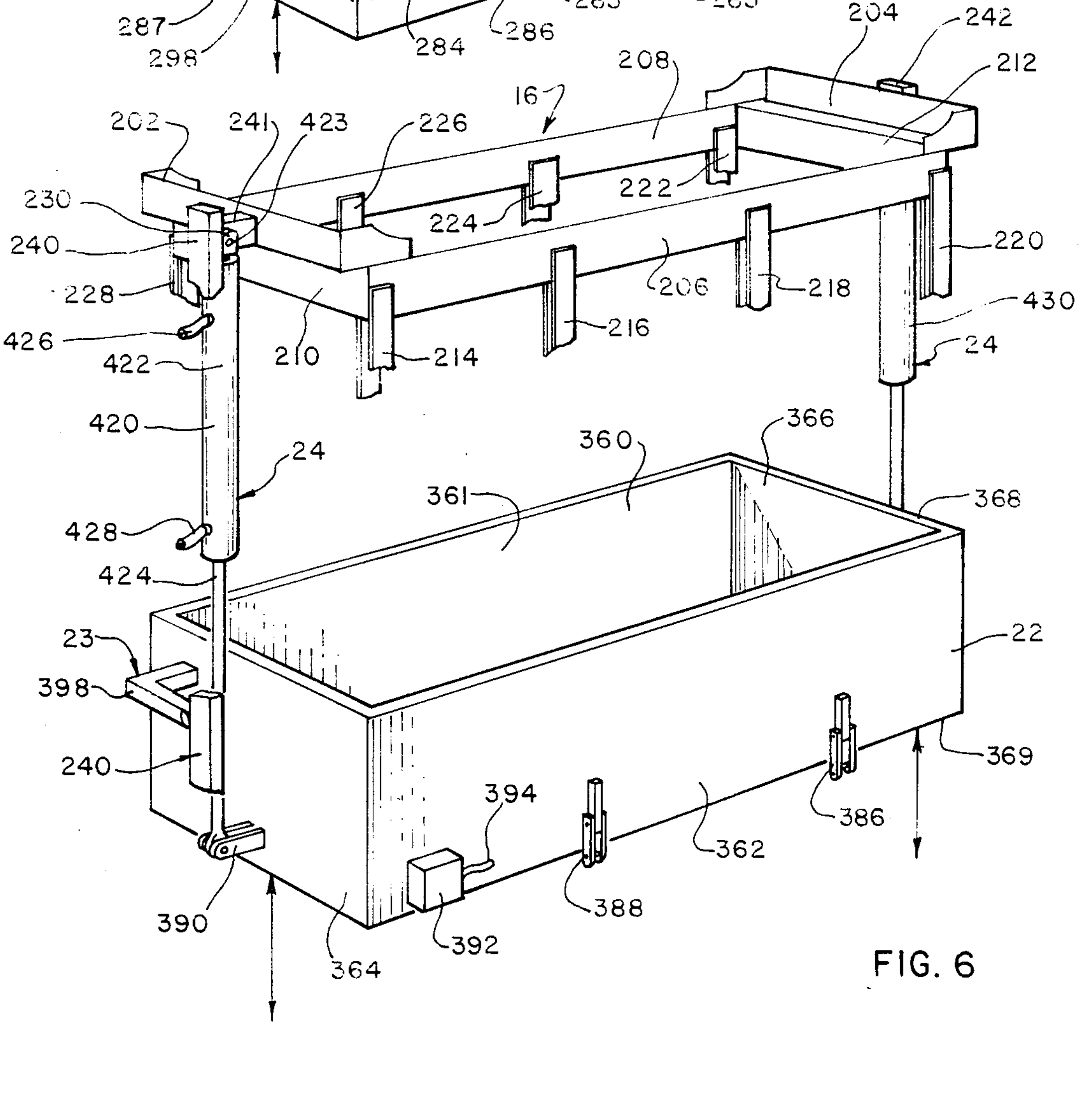
FIG. 6 is a perspective, partially cut-away, detail view of a vault machine mainframe and outer form and displacement apparatus.
Figure 8:
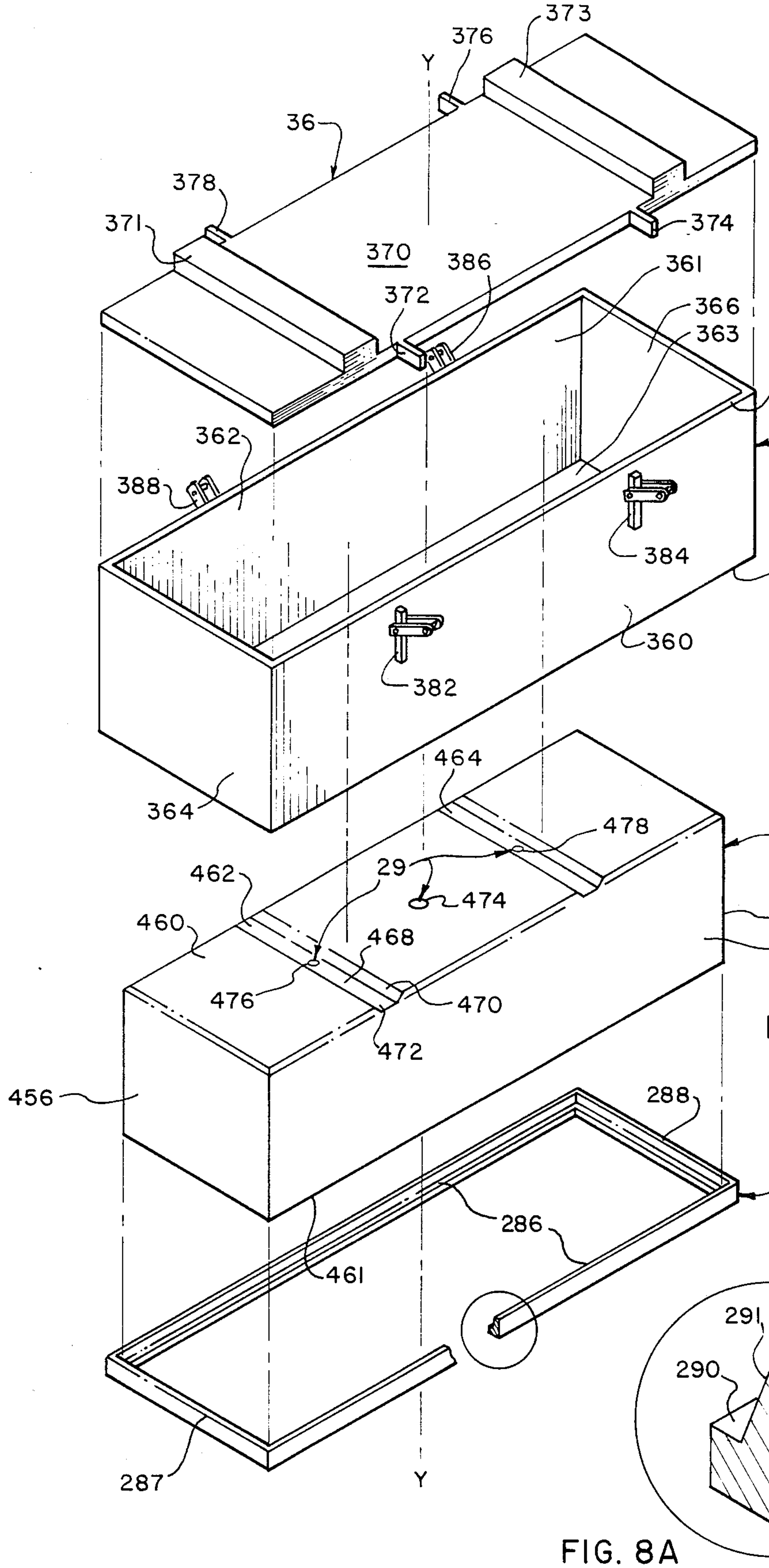
FIG. 8 is an exploded perspective view illustrating the relationship of the various vault machine forms.
Figure 8A:
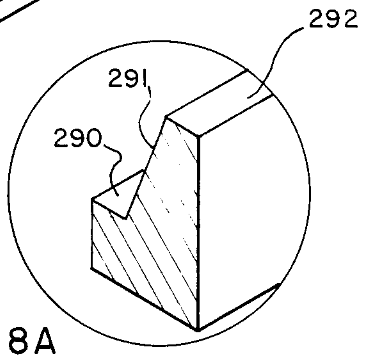
FIG. 8A is a detail perspective view of a cross-sectional portion of a vault sidewall peripheral edge forming surface.

As best illustrated by FIGS. 6 and 8, the outer form means 22 may comprise two longitudinal sidewalls 360, 362 and two transverse sidewalls 364, 366 integrally connected as by weldement or the like to form a generally rectangular box-like configuration which is open at two opposite bottom and top face portions 361, 363 thereof. The outer form sidewalls comprise a lower peripheral edge portion 368 located proximate a lower portion of a vault-to-be-formed therewithin and an upper peripheral edge portion 369 located proximate an upper portion of a vault-to-be-formed therewithin. A cover means 36 such as a pallet cover 370 having transverse pallet legs 371, 373 mounted on an outer surface portion thereof, may be removably attached to outer form lower peripheral portion 368 to cover open face portion 361. The connection may be provided as by pallet extension members 372, 374, 376, 378 which may be clampingly engaged by clamp assemblies 382, 384, 386, 388 mounted on longitudinal sidewall portions 360, 362. A pair of cylinder attachment clevis assemblies 390 (only one shown) may be fixedly mounted as by weldement or the like on both transverse walls 364, 366 for attachment to outer form linear displacement means 24 as described in further detail hereinafter. A vibrator means such as hydraulic vibrator unit 392 conventionally operable by hydraulic fluid supplied through a hydraulic port means as through hydraulic line 394 may be attached to an outer wall surface of the outer form means as shown in FIG. 6. In a preferred embodiment, a vibration unit 392 is attached near opposite diagonal corners of the outer form means and the hydraulic line 394 is removably attachable thereto so as to be disengageable therefrom subsequent to vibration of the outer form means in the initial pouring position illustrated in FIG. 1. As best illustrated in FIGS. 2, 4, and 6 the outer form means is slideably mounted on mainframe outer vertical members 240, 242 as by L-shaped members 396–403. Each L-shaped member comprises a first end which is fixedly attached to an outer surface of an associated transverse plate 364, 366 and a second end having a roller 410 conventionally mounted thereon as by a clevis assembly. Each roller is engageable with a forward or rearward side surface of an associated vertical member 240, 242 whereby the outer form means is slideably displaceable along the length of the outer vertical members 240, 242.

As shown by FIG. 6, the outer form linear displacement means 24 may comprise a pair of cylinder means 420, 430, which in a preferred embodiment comprise a pair of hydraulic cylinder means. Cylinder means 420 may comprise a cylinder barrel portion 422 operably attached as by clevis portion 423 to the mainframe 16 as at connector portion 241. Cylinder means 420 also comprises an extendable/retractable piston rod portion 424 conventionally attached to the outer form means as by clevis portion 390. Cylinder means 420 may be conventionally operated as by hydraulic fluid under pressure supplied to fluid ports therein as by hydraulic lines 426, 428. Cylinder means 430 may be of identical construction to cylinder means 420 and identically attached to transverse wall 366 and associated mainframe connector portion.

Figure 7:
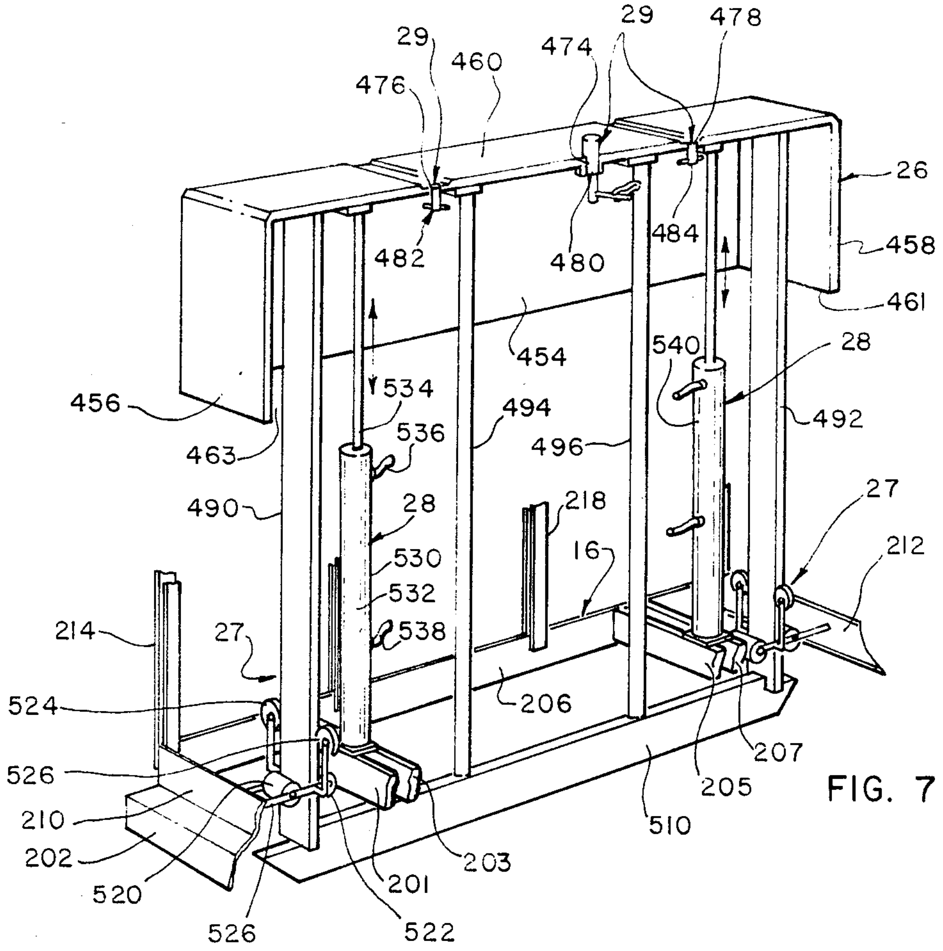
FIG. 7 is a perspective, partially cross-sectional, partially cut-away detail view of a vault machine mainframe and inner form and displacement apparatus.

As best illustrated by FIGS. 7 and 8, inner form means 26 may comprise a generally rectangular box-like configuration having longitudinal sidewalls 452, 454 and integrally connected transverse sidewalls 456, 458, all of which are fixedly connected to and extend substantially perpendicular to a bottomwall 460. The sidewalls terminate at the ends thereof opposite the bottomwall in a rectangular peripheral edge 461 which defines a rectangular open face 463 of the inner form means. The bottomwall 460 may comprise two transversely extending channel portions 462, 464 each having a horizontal surface 468, and two outwardly extending incline surfaces 470, 472. The channel portions cause formation of raised portions 68, 70 in the vault bottomwall interior surface as illustrated in FIG. 9. The inner form bottomwall 460 is also provided with vent means 29 which in a preferred embodiment include a center vent 474 positioned at the center of the bottomwall and two end vents 476, 478 positioned at central locations within the two transverse channel portions 462, 464. A plug 480, 482, 484 is provided for plugging each vent during initial pouring and setting of the concrete. Subsequent to removal of the inner form means from the vault being formed, the vent plugs 480, 482, 484 are removed to prevent vacuum formation in the area between a vault bottomwall interior surface and the inner form bottomwall exterior surface. In a preferred embodiment, plug 480 extends through center vent hole 474 and engages an oppositely positioned wall surface of the bottom form means 36. Thus, when the plug 480 is removed, a hole is provided in the bottomwall of the vault. The other plugs 482, 484 preferably terminate substantially in alignment with the outer surface of the inner form bottomwall 460, thereby producing no indentation in the vault bottomwall.

The inner form means 26 is displaceably mounted on the mainframe means 16. The structure for mounting the inner form means 26 may comprise two outer vertical support members 490, 492 and two inner vertical support members 494, 496. The vertical support members are fixedly attached at first ends thereof to the inner form bottomwall 460 as by weldement or other conventional attachment means and are conventionally, fixedly attached at the opposite ends thereof to a longitudinal cross-support member 510. Each outer vertical support members 490, 492 may be rollingly attached to the mainframe means 16 as by a pair of opposite longitudinally aligned rollers 520, 522 having parallel transverse axes and a pair of opposite transversely aligned rollers 524, 526 having parallel longitudinally aligned axes which engage respectively, transversely extending and longitudinally extending surfaces of an associated outer vertical support members. The rollers 520, 522, 524, 526 are operably mounted on a roller frame 526 fixedly attached to the mainframe means 16 at an associated transverse frame member 210, 212. The rollers restrain the vertical support members 490, 492 from moving longitudinally or transversely and thus limit the movement thereof to a direction perpendicular to the central longitudinal machine axis XX, FIGS. 1 and 3. During the periods of machine 10 operation, when the inner form means 26 is moved, this direction is generally vertical. The inner form 26 means may be linearly displaced relative the mainframe means 16 by inner form linear displacement means 28 which may comprise a pair of cylinder means 530, 540. In the preferred embodiment, these cylinder means comprise hydraulic cylinder means. The first cylinder means 530 may comprise a barrel portion 532 attached to the mainframe by conventional attachment means at transverse support members 201, 203. The first hydraulic cylinder means 530 also comprises an extendable and retractable piston rod portion 534 which is conventionally attached as by weldement, pinning, etc. to the inner form bottomwall 460 at a position thereon whereby the cylinder means 530 is positioned in parallel alignment with the inner form means vertical support members 490, 492, 494, 496. The cylinder means 530 may be conventionally operated by hydraulic fluid under pressure applied to ports therein as through hydraulic lines 536, 538. Cylinder means 540 may be of identical construction to cylinder means 530 and may be similarly attached and aligned at transverse support members 205, 207 and an associated portion of inner form bottomwall 460. Thus, extension and retraction of cylinder means 530, 540 at equal rates cause linear movement of inner form means 26 with respect to the mainframe means 16. In the preferred embodiment, the cylinder means 530, 540 are positioned in symmetrical relationship with respect to the inner form means 26 and mainframe means 16.

As best illustrated in FIGS. 4 and 9, the power supply means 38 for providing power for operating the various displacement means may be provided in a power supply housing 560 mounted on wheels 562 and physically attached as by housing portion 563 to the carriage means 12 whereby it is horizontally movable with the carriage means across base surface 15. The power supply means provided within the power supply housing 560 may comprise a conventional electric motor and a conventional hydraulic fluid pump and reservoir. The electric motor may in turn be electrically connected as by electric power line 564 and vertical sliding electrical pick-up 566, to an overhead electric power source 568 of conventional construction, FIG. 9. The vault machine 10 may thus be moved horizontally along track 14 without dragging electrical cords. Hydraulic conduit means such as a hydraulic supply line and return line 570, 571, FIG. 2, conventionally operably connect the hydraulic motor and reservoir within housing 560 to a hydraulic control means 40. As illustrated by FIG. 2, the hydraulic control means may comprise a control panel consisting of a plurality of standard two-way hydraulic control valves (not shown) conventionally operable by manual levers. In the preferred embodiment, the control valves include a hydraulic motor control valve (not shown) and associated lever 601, for reversibly controlling the carriage movement means 13; a mainframe angular displacement control valve (not shown) with associated lever 603 for controlling the mainframe angular displacement means 20; a mainframe linear displacement hydraulic control valve (not shown) and associated lever 605 for controlling the mainframe linear displacement means 18; an outer form control valve (not shown) and associated lever 607 for controlling the outer form linear displacement means 24; inner form control valve (not shown) and associated lever 609 for controlling inner form linear displacement means 28; and edge form control valve (not shown) and associated lever 611 for controlling the edge form linear displacement means 32. In the preferred embodiment, each of the mainframe and form linear displacement means comprise a pair of hydraulic cylinders which must be actuated and operated in simultaneous relationship, thus conventional means such as a standard flow divider valve which divides the flow of fluid thereto from a single line into two separate and equal flows which are provided to two associated cylinders, or other apparatus well-known in the art is provided for each pair of cylinder means used for linear displacement to ensure appropriate parallel operation. The simultaneous and parallel operation of a pair of hydraulic cylinder units is conventional and well understood in the art.

The particular construction of the vault machine 10 described above may be used to provide a vault 11 such as illustrated in FIG. 9 which is used in cooperation with an independently formed vault cover (not shown) which matingly engages the upper peripheral edge of the vault 11 to form a tight and stable seal therewith. In another preferred embodiment of the invention, a compound vault 11A may be formed. As shown by FIG. 20*a*, compound vault may comprises an upper portion 650 and a lower portion 652, comprising respectively a pair of upper portion longitudinal sidewalls 654, a pair of upper portion transverse sidewalls 658, an upper portion top wall 662, integrally formed with the sidewalls, and a pair of lower portion longitudinal sidewalls 656, a pair of lower portion transverse sidewalls 660 and a lower portion bottomwall 664 integrally connected therewith. In the vault 11A of this construction, the sidewalls of the upper and lower portions each have a depth of approximately half the depth of a conventional vault 11. The sidewalls also comprise peripheral edge portions 670, 672 having complimentary surface configurations allowing the upper and lower vault portions to be stably and sealingly engaged in the same manner as provided between the conventional vault 11 and associated vault cover. The upper and lower portions of the vault 650, 652 thus engaged, provide a compound vault 11A of substantially identical exterior and interior dimensions to that of a conventional vault 11 and vault cover (not shown).

The vault machine 10 used for producing such a compound vault 11A is essentially identical to the vault machine 10 described above, except that an edge form means 30A, which includes additional structure, is provided. As illustrated by FIG. 19, the transversely extending members 287, 288 and the lower form portion 286 of longitudinal members 280, 282, in FIG. 5, may be replaced by longitudinal members 682 and transverse members 684 which terminate in a planar surface 685 as opposed to a vault wall upper edge forming surface. Surface 685 abuttingly engages a planar peripheral surface 689 of a upper-vault-portion-forming-drop-in ring 690 or a surface 709 of a lower-vault-forming-drop-in ring 710. The longitudinal and transverse sidewall 682, 684 thus comprise a rectangular engagement ring 680 which is identically attached to other edge form structure as described above with reference to FIG. 5. Ring 680 abuttingly engages either upper vault drop-in 690 or lower vault drop-in 710 depending upon which portion of the compound vault 11A is being formed. The upper vault drop-in 690 comprises a pair of longitudinal sidewalls 692 and a pair of transverse sidewalls 694 integrally connected therewith and defining a peripheral edge portion 696 having a first horizontal surface 698, a second horizontal surface 702 and a diagonal surface 704 positioned therebetween. A lip portion 706 may be integrally formed with first horizontal surface 698. Lower vault drop-in 710 comprises a pair of longitudinal sidewalls 712, a pair of transverse sidewalls 714, integrally connected therewith and defining a peripheral edge portion 716 having first horizontal surface 718, a second horizontal surface 720 and a diagonal surface 722 positioned therebetween. The edge portion 716 may further comprise a lip portion 724 integrally formed with first horizontal surface 718. The relationship of surfaces 698, 702, 704 of the upper drop-in form with the surfaces 718, 720, 722 of the lower drop-in form is such that a pair of matingly engageable surfaces are provided on the upper and lower vault portions 650, 652 which are formed thereby. The depth of the sidewalls of each form member is such that the vault portion formed thereby has a dimension of substantially one-half the depth of a conventional vault 11. In the forming operation, the lip portions 706 and 724 aid in the formation of the associated vault portion peripheral sidewall edge by providing a downwardly extending form surface at the outermost portion of the vault edge which prevents chipping and which also tends to provide support to the entire vault during an initial setting portion immediately after the other vault forms have been removed. In a vault machine of this construction, the vault drop-in 690 or 710 is left on top of the vault portion 650 or 652 after the other portions of the vault machine have been removed from engagement therewith. Thus, the vault machine 10 may be removed to a position and provided with another drop-in and filled with concrete to begin formation of a second vault portion while the first used drop-in remains on the first formed vault portion during an initial 10 or 15 minute period when the fresh concrete is in a relatively low strength condition. The vault drop-in may be removed after this initial setting period and reinserted into the vault machine to begin the next compound vault-forming operation.

The specific operation of the invention will now be described with reference to FIGS. 10 through 18.

Figure 10:
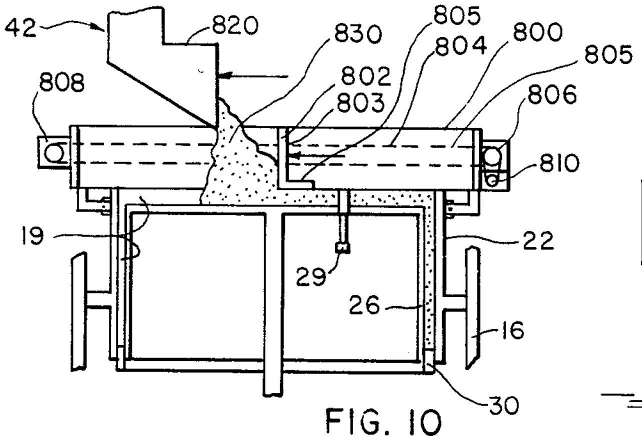
FIGS. 10 through 18 are schematic frontal cross-sectional views illustrating various operations of a vault machine used in forming a vault.

Prior to the pouring step illustrated in FIG. 10, the vault machine 10 is positioned with the various form means 22, 26 and 30 and the mainframe means 16 in the configuration illustrated in FIG. 1 with the inner form 26 positioned within the walls of the outer form 22 and with the edge form 32 positioned slightly upwardly with respect to the peripheral edge 461 of the inner form means to define a cavity 19 of the same general configuration as a vault 11 to be formed with the exception that the edge form means 30 is positioned nearer inner form peripheral edge 461 than it will be at the end of the forming process when a final vault form configuration is defined. The inner form vent plugs are firmly inserted in the associated vent holes. The relationship between the various form means is illustrated in detail in FIG. 8 which shows that the form means 22, 26 and 30 are each linearly displaceable in a direction parallel a mainframe axis YY which is perpendicular to the central longitudinal machine axis XX.

As shown schematically by FIG. 10, the forming material conveying means 42 may include a pouring box 800 having open upper and lower faces; a screed member 802 mounted on longitudinally extending tracks (not shown) within the pouring box 800 and having a vertical portion 803 extending from a position even with the top of the outer form means 22 to a position even with the top of the box 800 and a horizontal member 805 having a surface extending parallel and even with the upper edge of the outer form 22. The screed member 802 may be attached to drive means 804 such as may be provided by sprockets 806, 808 rotatably mounted at opposite ends of box 800 and conventionally connected by an endless drive chain 805. One of the sprockets 806 may be mounted on a shaft (not shown) which is operably linked to a reversible drive unit, such as hydraulic drive rotor 810. The screed 802 may thus be moved longitudinally along the length of the box by actuation of the drive motor 810. A chute 820 conveying concrete or the like may also be movably mounted to move at a predetermined speed based on the rate of movement of the screed member. The flow rate of concrete through chute 820 is such that a sufficient amount of concrete for filling the formed cavity 19 is deposited in front of the screed member as it moves in the direction indicated in FIG. 10. Of course, non-automated methods such as conventionally pouring and hand leveling concrete into the formed cavity 19 may also be used in lieu of the automatic pouring and leveling apparatus described above. During the pouring operation, the outer form 22 may be attached to a vibrator 392, FIG. 6, to facilitate concrete flow into the various portions of the form cavity 19.

Figure 11:
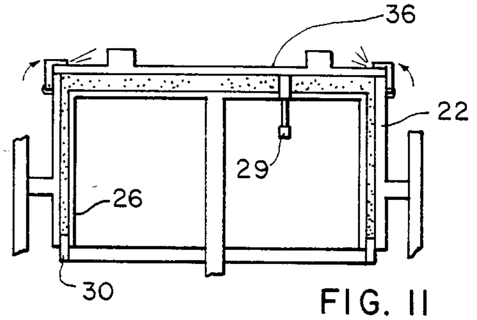

As illustrated by FIG. 11, the bottom form means 36 is next clampingly attached in covering relationship with the open face portion of the form cavity 19.

Figure 12:
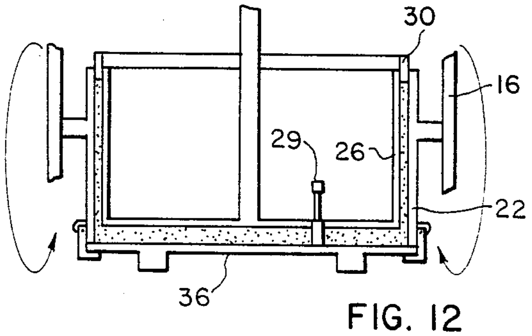

Next, as illustrated by FIG. 12, the outer, inner, edge, and bottom form means 22, 26, 30, 36 are rotated 180° as a unit to a position whereat form axis YY is again positioned substantially vertically. This inversion operation is illustrated in further detail in FIGS. 2 and 3, and is accomplished by rotation of the mainframe means 16 by the mainframe angular displacement means 20. In the preferred embodiment, this is accomplished by actuation of the control valve lever 603 associated with hydraulic cylinder means 160.

Next, the carriage means 12 is moved to a position where the completed vault is to be placed by actuation of the control valve lever 601 associated with hydraulic motor 184.

The form means 22, 26, 30, 36 are next moved downwardly as a unit, approximately 6 inches in the preferred embodiment, until the bottom form means 36 comes into contact with a base surface 15. In the preferred embodiment, this result is accomplished by moving the mainframe means 16 downwardly by actuation of the appropriate control lever 605 which cause cylinder means 140, 150, FIG. 4, to be retracted.

Figure 14:
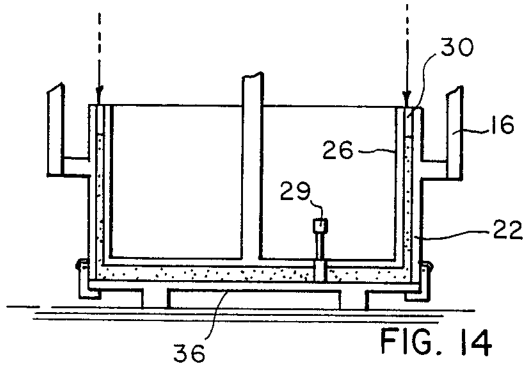

Next, as illustrated by FIG. 14, in the preferred embodiment, the peripheral edge form means 30 is moved downwardly with respect to the other form means 22, 26, 30, 36, thereby compressing the concrete or other forming material within the form cavity. Thus, the peripheral edge form means 30 in the preferred embodiment comprises a compression ring means which serves to compress the concrete as a part of the forming process. This operation considerably enhances the forming process in that the concrete in a compressed state is considerably strengthened as opposed to concrete in a state compacted only by the force of gravity. In the preferred embodiment, the edge form means 30 moves approximately 2 inches between the positions illustrated in FIGS. 13 and 14. It has been found that in making a vault 11 having a sidewall thickness of approximately 2 inches and a bottomwall thickness of approximately 2 inches and having a height measured from the upper peripheral edge of the sidewall to the bottom of the bottomwall of 19 inches and having an exterior length of 90 inches and an exterior width of 34 inches that a sufficient compressive force for operating the edge form cylinder units may be developed by a hydraulic system operating at a pressure of about 2000 pounds per square inch. The edge form is caused to be moved by actuating the appropriate control valve lever 611 associated with hydraulic cylinders 332 and 342. All of the forms then remain in an immobilized position for about 15 minutes after the compression operation is completed.

Figure 15:
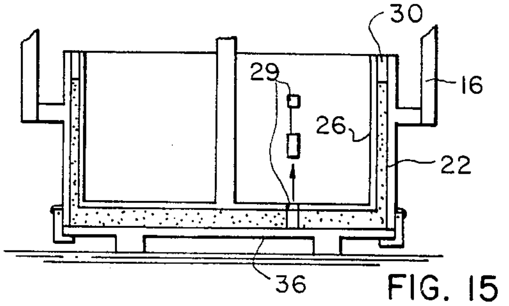

Next, as illustrated by FIG. 15, the inner form means is vented by removal of the plug portion of vent means 29.

Figure 16:
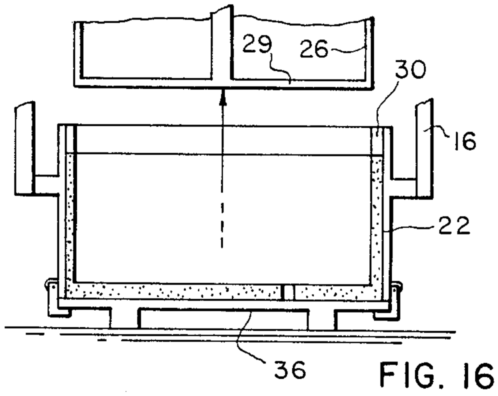
Figure 13:
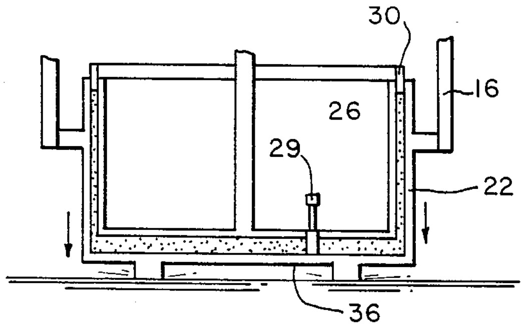

Next, as illustrated by FIG. 16, the inner form means 26 is disengaged from the concrete within the form cavity 19 and moved vertically upwardly to a position above the concrete. The inner form means 26 is moved by actuation of the appropriate control valve lever 609 causing cylinder means 530 and 540 to be retracted.

Figure 17:
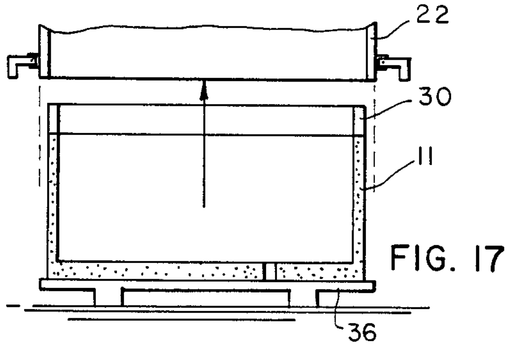

Next, the outer form means 22 is unclamped from the cover means 36 and is disengaged from the concrete by upward movement thereof to a position above the concrete as illustrated by FIG. 17. The outer form means 22 is removed by actuation of the appropriate control valve lever 607 to retract cylinder means 420 and 430.

Figure 18:
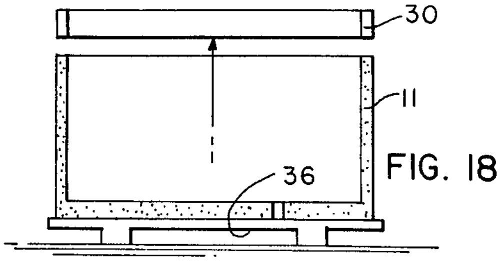

Next, as illustrated by FIG. 18, the edge form means 30 is removed from the upper peripheral edge of the concrete to provide a free-standing vault structure 11 supported on cover means 36.

In one embodiment of the invention, compressive force is removed from a drop-in portion of the edge form means 30A as described above with reference to FIG. 19 and the drop-in portion remains situated on the peripheral edge of the concrete for a period of about 15 minutes to provide further support to prevent bowing, etc. of the sidewalls of the vault during an initial curing period. The drop-in portion is thereafter removed from the vault by hand. In using the drop-in arrangement, the drop-in portion 690 or 709, FIG. 19, is dropped into the form cavity 19 with the edge forming surface thereof 696 or 716 positioned upwardly prior to pouring of concrete into the mold cavity.

The bottom form means 36 may comprise a pallet having leg portion 371, 373, FIG. 8, which allows easy transportation of the cover and associated vault 11 resting thereon as by a conventional fork lift in an operation subsequent to vault formation.

Although the above-described sequence of operation may take place with the carriage means 12 positioned at one horizontal location, in the preferred embodiment, between steps 12 and 13, the carriage means 12 is moved to a position removed from the forming material conveying means 42 such that a number of vaults 11 may be formed and deposited on a base surface without further manual manipulation thereof as shown in FIG. 9. Of course, prior to filling of the form cavity 19 with concrete, as illustrated in FIG. 10, the carriage 12 is moved back into a position immediately below the forming material dispensing means 42.

In a preferred operation, concrete provided with short length pieces of metal which may be corrugated steel strips on the order of 2 inches in length, ⅛ inch in width and 1/64 inch in thickness is used as opposed to conventional wire mesh inserted between the forms. This method is preferred in that the steel reinforcing material may be mixed directly with the concrete and does not require the further time consuming step of manual insertion between forms. Although concrete forming material is used in the preferred operation, any flowable hard-setting forming material such as plaster, adobe, etc. may be used to form a vault by the above-described method and apparatus. Adjustments may be required in the amount of compression, setting time, etc. necessary depending upon the forming material and mixing composition thereof. In a typical embodiment of the invention, the mainframe angular displacement means may comprise a hydraulic cylinder unit such as a 3½ inch bore 10 inch stroke cylinder. The mainframe linear displacement means 18 may comprise a pair of hydraulic cylinder means such as 3½ inch bore, 24 inch stroke cylinders. The outer form linear displacement means 24 may comprise a pair of hydraulic cylinder means such as 3½ inch bore, 24 inch stroke cylinders. The inner form linear displacement means 28 may comprise a pair of hydraulic cylinder means such as 3½ inch bore, 24 inch stroke cylinders. The peripheral edge form linear displacement means may comprise a pair of hydraulic cylinder units such as 3 inch bore, 2 inch stroke cylinder. The hydraulic motor unit of the carriage movement means 13 may comprise a conventional or bit type hydraulic motor rated at 1650 inch pounds of torque. The hydraulic pump unit may comprise a conventional hydraulic pump which may be rated at 7 gallons per minute at 2000 pounds pressure and driven by a conventional motor operating on a 480 volt AC circuit. The various form walls and mounting structure may comprise a high-strength mounting material such as high abrasion resistant steel or the like which is conventionally welded, bolted, etc. at the various fixedly attached interfacing surfaces of the structure as described above. Although a four-sided rectangular vault structure is described, multi-sided vault structures may, of course, also be formed by using forms of the appropriate configuration and are within the scope of the invention. Similarly, although the outer and inner form means 22, 26 are described in the preferred embodiment as being substantially vertical, it will be obvious to any person with skill in the art that the walls of the outer form means may be sloped in a direction to provide a vault having an exterior wall surfaces which slope inwardly from the bottom to the top thereof. It will also be obvious that the inner form means may be constructed to form a vault such that the interior wall surfaces of the vault slope outwardly from the bottom to the top thereof. In a preferred embodiment of the invention, the forms are oiled or provided with other suitable antifriction surface covering prior to introduction of concrete.

It is contemplated that the inventive concepts herein described may be variously otherwise embodied and it is intended that the appended claims be construed to include alternative embodiments of the invention except insofar as limited by the prior art.

What is claimed is:

1. A vault machine for making burial vaults of a type having a bottomwall and an integrally formed sidewall positioned substantially perpendicular to the bottomwall from a forming material having a pourable fluid state and a set solid state such as concrete or the like, the vault machine comprising:

carriage means for supporting various machine components for enabling relative movement thereof;

outer form means for forming exterior sidewall surfaces of a vault;

bottom form means fixedly engageable with said outer form means for forming an exterior bottomwall surface of a vault;

inner form means for forming interior sidewall and bottomwall surfaces of a vault;

edge form means for forming an upper peripheral edge surface of the vault sidewall;

mainframe means operably mounted on said carriage means for supporting and collectively repositioning said outer form means, said bottom form means, and said inner form means;

said mainframe means being rotatably displaceable about a substantially horizontal mainframe central axis of rotation;

said mainframe central axis of rotation being linearly displaceable relative said carriage means along a mainframe linear displacement path perpendicular said central axis of rotation;

said outer form means being linearly displaceable relative said mainframe means along an outer form linear displacement path parallel said mainframe linear displacement path;

said inner form means being linearly displaceable relative said mainframe means along an inner form linear displacement path parallel said mainframe linear displacement path;

said edge form means being linearly displaceable relative said mainframe means along an edge form linear displacement path parallel said mainframe linear displacement path.

2. The invention of claim 1 further comprising:

mainframe angular displacement means for rotating said mainframe about said mainframe central axis of rotation;

mainframe linear displacement means for linearly displacing said mainframe means relative said carriage means along said mainframe linear displacement path;

outer form means linear displacement means for linearly displacing said outer form means relative said mainframe means along said outer form linear displacement path;

inner form means linear displacement means for displacing said inner form means relative said mainframe means along said inner form linear displacement path;

edge form linear displacement means for displacing said edge form means relative said mainframe means along said edge form linear displacement path;

said outer form, inner form and edge form linear displacement means being independently operable for causing relative displacement between said outer form means said inner form means, and said edge form means;

said outer form means, said inner form means, said bottom form means, and said edge form means being positionable to define a form cavity for receiving forming material therein.

3. The invention of claim 2 further comprising:

power supply means for driving each of said displacement means; and control means for actuating each of said displacement means.

4. The invention of claim 3 wherein said carriage means comprises opposite carriage stand means for supporting said frame means therebetween.

5. The invention of claim 4 wherein said carriage means is horizontally movable across a base surface.

6. The invention of claim 5 wherein said carriage means comprises carriage wheel means for enabling horizontal movement across a base surface.

7. The invention of claim 6 further comprising carriage movement means for moving said carriage means across a base surface.

8. The invention of claim 7 wherein said carriage movement means comprises carriage motor means operably mounted on said carriage means.

9. The invention of claim 8 wherein said opposite carriage stand means each comprise:

a rigid horizontal member extending in a direction perpendicular to said frame means central axis of rotation and being of sufficient length to prevent toppling of said vault machine during rotation of said frame means.

10. The invention of claim 9 further comprising track means operably engageable with said carriage wheel means for guiding said vault machine between a first horizontal position associated with pouring of forming material into said form cavity and a second horizontal position associated with removal of said outer and inner form means and said edge form means from a completed vault.

11. The invention of claim 4 wherein said frame means comprise:

a frame base portion extending substantially the distance between said opposite carriage stands; and frame elongate attachment members for attaching said frame means to said carriage stands said frame elongate members being positioned at opposite ends of said frame base portions and adjacent associated carriage stands, said frame elongate attachment members extending perpendicular to said frame base portion.

12. The invention of claim 11 wherein said frame elongate attachment members are rotatably attached to associated carriage stands by opposite coaxial shaft means defining said central axis of rotation of said frame means.

13. The invention of claim 12 wherein said opposite shaft means are mounted in shaft holder means for rotatably holding said shaft means said shaft holder means being vertically displaceable relative said carriage means.

14. The invention of claim 13 wherein said shaft holder means comprises plate means mounted in vertically extending plate guide means, said plate guide means comprising vertically disposed members fixedly mounted on said carriage stand rigid horizontal members.

15. The invention of claim 13 wherein said mainframe angular displacement means comprises:

gear means mounted on said shaft means; and gear drive means operably associated with said gear means.

16. The invention of claim 15 wherein said gear drive means is operably mounted on said shaft holder means.

17. The invention of claim 16 wherein said gear means and said gear drive means comprise a rack and pinion assembly comprising pinion means, rack means and cylinder means for operably moving said rack relative said pinion means for selectively causing rotation thereof.

18. The invention of claim 16 wherein said mainframe means linear displacement means comprises cylinder means operably associated with said shaft means holder means for causing displacement thereof relative said carriage means.

19. The invention of claim 18 wherein said frame means further comprises:

frame edge form guide members operably attached to peripheral portions of said frame base portion and extending perpendicularly therefrom in parallel alignment with said mainframe elongate attachment members.

20. The invention of claim 11 wherein said outer form means is slideably mounted on said mainframe elongate attachment members.

21. The invention of claim 20 wherein said outer form linear displacement means comprises outer form cylinder means operably mounted between an exterior surface portion of said outer form means and a portion of said mainframe base means.

22. The invention of claim 21 wherein said outer form means comprise two longitudinal sidewall portions and two transverse sidewall portions perpendicular said longitudinal sidewall portions.

23. The invention of claim 22 wherein said outer form cylinder means comprises two cylinder units, one operably attached to each of said transverse side walls of said outer form means.

24. The invention of claim 22 further comprising vibrator means operably mounted on at least one of said outer form sidewalls for vibrating concrete received in said form cavity.

25. The invention of claim 20 further comprising clamping means operably mounted on said outer form means for detachably securing said bottom form means to a peripheral edge surface thereof.

26. The invention of claim 20 wherein said inner form means comprises inner form mounting structure for linearly displaceably mounting said inner form means on said mainframe means.

27. The invention of claim 26 wherein said inner form means comprises a bottomwall portion and wherein said inner form mounting structure is operably attached thereto.

28. The invention of claim 27 wherein said inner form mounting structure comprises at least two elongate members fixedly mounted at first ends thereof to said inner form bottomwall and fixedly attached at second ends thereof to a cross-support member and slideably mounted along the length thereof to inner form guide means operably mounted on said mainframe base portion for guiding said inner form means along said inner form linear displacement path.

29. The invention of claim 27 wherein said inner form bottomwall comprises indentation portions therein for forming transverse raised portion on the vault bottomwall interior surface for accepting a casket thereon in raised relationship to the remainder of the bottomwall interior surface.

30. The invention of claim 29 further comprising vent means in said inner form bottomwall portion for equalizing air pressure between the atmosphere and an area between the vault bottomwall interior surface and said inner form bottomwall as said inner form is retracted from the vault.

31. The invention of claim 30 wherein said vent means comprises a central hole in said inner form means bottomwall and a plug means positionable in said central hole and extendable therethrough into abutting contact with said bottom form means for forming a central hole through the bottomwall of the vault when said plug means is withdrawn.

32. The invention of claim 27 wherein said inner form means linear displacement means comprises cylinder means operably attached between said inner form means bottomwall portion and said mainframe means base portion.

33. The invention of claim 19 wherein said edge form means is slideably mounted within said frame edge form guide means.

34. The invention of claim 33 wherein said edge form means is movable from a predetermined form for means material loading position to a predetermined form material compressing position, whereby said forming material is compressed and strengthened prior to form means removal.

35. The invention of claim 34 wherein said edge form comprises a width substantially equal to the width of said form cavity in an area associated with the formation of an upper portion of the vault sidewall.

36. The invention of claim 35 wherein said edge form comprises a predetermined lip forming surface for providing a seal forming lip on the vault upper peripheral edge surface whereby a vault cover having a complimentary lip configuration may be placed in sealing relationship thereon.

37. The invention of claim 35 wherein said edge form means linear displacement means comprises edge form cylinder means operably attached to said edge form means and said mainframe means.

38. The invention of claim 37 wherein said edge form means comprises a fixed portion and a drop-in portion said drop-in portion comprising said predetermined lip forming surface and having a predetermined depth, the depth of said drop-in portion being inversely proportional to the depth of a vault being formed thereby.

39. The invention of claim 38 comprising a plurality of interchangeable drop-in portions.

40. The invention of claim 39 comprising at least two drop-in portions having lip forming surfaces of complementary shape whereby a vault formed by use of a first drop-in portion is sealably mountable on a vault formed by use of a second drop-in portion whereby a compound vault may be formed from said two vaults formed by use of said first and second drop-in portion by placing the lip portions thereof in sealing contact.

* * * * *